United States Patent Office 2,959,472
Patented Nov. 8, 1960

2,959,472

DIPHENYLAMINE - LACTONITRILE CONDENSATION PRODUCT AND PETROLEUM HYDROCARBONS CONTAINING IT

William B. Hardy and Frederic H. Adams, Bound Brook, N.J., assignors to American Cyanamid Company, New York, N.Y., a corporation of Maine No Drawing. Filed Sept. 30, 1958, Ser. No. 764,245

3 Claims. (Cl. 44—75)

This invention relates to mineral oils such as cracked gasolines, lubricating oils and the like which tend to deteriorate on storage or use by oxygen absorption and to the provision of a novel antioxidant for inhibiting such deterioration.

It is a well-known fact that volatile hydrocarbons of petroleum origin containing unsaturates, such as cracked gasoline and the like, have a tendency to deteriorate on storage by polymerization and gum formation. Saturated petroleum hydrocarbons such as lubricating oil stock and white mineral oils are also subject to oxidative deterioration. Our present invention is based on the discovery of a highly effective antioxidant which, when incorporated into these and similar hydrocarbons in small but effective amounts, will inhibit such deterioration and lengthen the effective life of the hydrocarbon.

Our novel antioxidant is the condensation product of diphenylamine with lactonitrile. It was obtained by heating at least 2 molar proportions of lactonitrile with 1 molar proportion of diphenylamine at temperatures above 200° C. and preferably in the range of about 240°–250° C. When these reagents are heated together for about 20 hours, preferably in the presence of a small quantity of a condensation initiator or acid catalyst such as iodine, toluenesulfonic acid, methanesulfonic acid or hydrochloric acid, a crude reaction product is obtained. Upon stripping volatiles from this product a dark, viscous material having slightly adhesive properties is produced; this is the new antioxidant of our invention. It is soluble in gasoline, kerosene, fuel oils, white mineral oil, lubricating oil and other petroleum hydrocarbons requiring stabilization and is an effective antioxidant when added thereto in quantities as little as 0.001% by weight. In most cases, however, it is used in higher concentrations within the range of about 0.01% to 0.1% by weight in order to maintain a reserve of antioxidant in the hydrocarbon, thus lengthening its effective storage life. Concentrations of from about 0.001% to 0.1% or more by weight are hereinafter described as antioxidizing amounts.

In preparing our antioxidant we charged an autoclave with 169 parts by weight of diphenylamine (1 mol) and 150 parts of lactonitrile (2.1 mols) together with 1 part by weight of iodine. The autoclave was heated to 240°– 245° C. and shaken at these temperatures for 20 hours. The pressure was then released and the crude material was heated under 20 mm. of mercury absolute pressure and at 95° C. until the excess lactonitrile, water and other volatiles were removed. There remained 242.5 parts of a residue which was found on analysis to contain 47.62% of carbon, 6.48% of nitrogen, and 4.42% of hydrogen. Its chemical constitution is unknown. The same product is obtained using 1 part by weight of toluenesulfonic acid in place of iodine.

The effectiveness of the new condensation product as a gasoline antioxidant was determined by the ASTM D 525–49 test in which a cracked gasoline containing the antioxidant under test is oxidized in a bomb initially filled at room temperature with oxygen at 100 p.s.i. and heated at a temperature between 90° and 102° C. The pressure is recorded continuously until the break point is reached; the time required for the sample to reach this point is the induction period. The ratio of the induction period of the sample with and without the antioxidant under test is a measure of its effectiveness. Two samples of the condensation product were tested by this procedure in comparison with gasoline containing no antioxidant and with gasoline containing an equal quantity of diphenylamine with the following results:

|  | Conc., Percent | Induction Period Ratio |
|---|---|---|
| Diphenylamine-Lactonitrile Condensation Product | 0.01 | 1.69 |
| Do | 0.01 | 1.60 |
| Diphenylamine | 0.01 | 1.00 |
| Plain Gasoline | 0.01 | 1.00 |

These results show that at the low concentrations of 0.01% the new condensation product of the present invention increases the induction period in gasoline by about 60–70%. This increase is comparable to that obtained with the antioxidants now in commercial use such as methylene bis(2,4-dialkylphenol) and N-butyl p-aminophenol.

The new condensation product was also tested as an antioxidant in a white mineral oil sold commercially as "Fractol A." This is a U.S.P. heavy mineral oil having a Saybolt viscosity of 200 seconds at 100° F., a flash point of 350° F. minimum and a boiling range of from 644° F. initial to 919° F. final.

A sample of this mineral oil containing 0.0133% by weight of the above-described diphenylamine-lactonitrile condensation product and another sample of the oil containing no antioxidant were heated to 150° C. and maintained at this temperature while a stream of air was passed through each sample. The off gas from the air blowing was analyzed for oxygen content by means of a paramagnetic oxygen analyzer and the time was measured when detectable oxygen uptake first occurred. The uninhibited mineral oil began absorbing oxygen within 1 to 2 minutes while the sample containing the antioxidant went through an induction period of 21.5 hours before oxidation was detected.

It will thus be seen that our present invention provides an effective antioxidant for gasoline, kerosene, fuel oil, mineral oil and other petroleum hydrocarbons which deteriorate upon storage in contact with air or which are subject to oxidation at elevated temperatures. This antioxidant is cheap and easily prepared from materials that are obtainable in large quantities. Lactonitrile is formed as a by-product in the synthesis of acrylonitrile by the reaction of acetylene with hydrocyanic acid, and it is an important advantage of the invention that it provides a commercial outlet for this material. Diphenylamine is a well-known antioxidant for dry rosin sizes, although it has no antioxidant action in gasoline, and is available commercially in large quantities. Since our new antioxidants are prepared simply by heating these two ingredients together at condensation temperatures within the range of about 200°–250° C., preferably in the presence of an acid catalyst, no expensive processing costs are involved.

What we claim is:

1. A petroleum hydrocarbon subject to oxidative deterioration and containing, in an antioxidizing amount, the product formed by condensing 2 mols of lactonitrile with 1 mol of diphenylamine, within the temperature range of about 200°–250° C. in the presence of an acid catalyst.

2. A volatile petroleum hydrocarbon tending to deteriorate upon storage in contact with air and containing, in an antioxidizing amount, the product formed by condensing 2 mols of lactonitrile with 1 mol of diphenylamine, within the temperature range of about 200°–250° C. in the presence of an acid catalyst.

3. The condensation product obtained by heating at least 2 mols of lactonitrile with 1 mol of diphenylamine at a condensation temperature within the range of about 200°–250° C. in the presence of an acid catalyst and stripping volatiles from the resulting reaction product.

References Cited in the file of this patent

UNITED STATES PATENTS

| | | |
|---|---|---|
| 2,149,678 | Hovey et al. | Mar. 7, 1939 |
| 2,299,128 | Codd et al. | Oct. 20, 1942 |
| 2,317,130 | Coes et al. | Apr. 20, 1943 |
| 2,387,501 | Dietrich | Oct. 23, 1945 |
| 2,666,745 | Mullen et al. | Jan. 19, 1954 |
| 2,800,450 | Bondi et al. | July 23, 1957 |
| 2,809,983 | Heininger | Oct. 15, 1957 |
| 2,819,197 | Santmyer et al. | Jan. 7, 1958 |
| 2,847,452 | Applegath et al. | Aug. 12, 1958 |
| 2,898,301 | Mayhew et al. | Aug. 4, 1959 |
| 2,917,541 | Anatol et al. | Dec. 15, 1959 |